(12) United States Patent
Kupfer

(10) Patent No.: US 12,064,721 B2
(45) Date of Patent: Aug. 20, 2024

(54) FILTER ELEMENT AND METHOD FOR MANUFACTURING A FILTER ELEMENT

(71) Applicant: MANN+HUMMEL GmbH, Ludwigsburg (DE)

(72) Inventor: Friedrich Kupfer, Marklkofen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 329 days.

(21) Appl. No.: 17/708,484

(22) Filed: Mar. 30, 2022

(65) Prior Publication Data
US 2022/0288525 A1 Sep. 15, 2022

Related U.S. Application Data

(63) Continuation of application No. PCT/EP2020/076062, filed on Sep. 18, 2020.

(51) Int. Cl.
*B01D 46/52* (2006.01)
*B01D 46/00* (2022.01)
*B01D 46/24* (2006.01)

(52) U.S. Cl.
CPC ....... *B01D 46/523* (2013.01); *B01D 46/0001* (2013.01); *B01D 46/2411* (2013.01); *B01D 2265/06* (2013.01); *B01D 2275/208* (2013.01)

(58) Field of Classification Search
CPC ............ B01D 46/0001; B01D 46/2411; B01D 46/521; B01D 2265/06; B01D 2275/208
See application file for complete search history.

(56) References Cited

U.S. PATENT DOCUMENTS

| | | | |
|---|---|---|---|
| 4,066,553 A | 1/1978 | Bardonnet et al. | |
| 4,402,830 A | 9/1983 | Pall | |
| 4,652,285 A | 3/1987 | Greene | |
| 6,524,479 B2 | 2/2003 | Schwinghammer | |
| 6,875,342 B2 | 4/2005 | Shane | |
| 7,255,723 B2 | 8/2007 | Choi et al. | |
| 2003/0075500 A1 | 4/2003 | Kleinguenther et al. | |
| 2007/0277488 A1* | 12/2007 | Eisengraeber-Pabst | B01D 46/2411 210/493.1 |
| 2009/0200228 A1 | 8/2009 | Eisengraber-Pabst et al. | |

FOREIGN PATENT DOCUMENTS

| | | |
|---|---|---|
| CN | 202638171 U | 1/2013 |
| CN | 103977647 A | 8/2014 |
| DE | 10244925 A1 | 4/2004 |
| DE | 102007003410 A1 | 7/2008 |
| DE | 102016005156 A1 | 1/2017 |
| EP | 0867216 A1 | 9/1998 |

* cited by examiner

*Primary Examiner* — Robert Clemente

(57) ABSTRACT

A filter element for filtering a fluid has a zigzag-shaped folded filter medium with fold edges neighboring each other. A thread is attached by an adhesive material to the fold edges. The thread is a multiple-wound yarn. In a method for manufacturing the filter element, a thread in the form of a multiple-wound yarn is attached by an adhesive material to fold edges of a zigzag-shaped folded filter material. In the method, the thread is soaked and/or coated with the adhesive material that is in a plastic state. The thread soaked and/or coated with the adhesive material is attached to the fold edges by applying a pressure, and the adhesive material is hardened.

16 Claims, 3 Drawing Sheets

FILTER ELEMENT AND METHOD FOR MANUFACTURING A FILTER ELEMENT

CROSS-REFERENCE TO RELATED APPLICATIONS

This application is a continuation application of international application No. PCT/EP2020/076062 having an international filing date of 18 Sep. 2020 and designating the United States, the international application claiming a priority date of 30 Sep. 2019 based on prior filed German patent application No. 10 2019 126 385.9, the entire contents of the aforesaid international application and the aforesaid German patent application being incorporated herein by reference.

BACKGROUND OF THE INVENTION

The present invention concerns a filter element for filtering a fluid, in particular for filtering combustion air in a motor vehicle and/or for filtering operating media of a motor vehicle, as well as a method for manufacturing such a filter element.

In filter elements, for example, air filters for combustion air of a motor vehicle, zigzag-shaped folded filter media of the type of a fold pack or folded bellows are often used. In order to stabilize the zigzag-shaped folds and prevent closure of filter surface during operation, the folds are often reinforced by support means.

DE 10 2005 036 366 A1 discloses a method for stabilizing folded filter media. In the method, a thread that is coated with a hot-melt adhesive is wrapped around a cylinder-shaped filter element of an endless folded bellows. In this context, a plastic state of the hot-melt adhesive is maintained by thermal means during wrapping of the coated thread across the fold tips. Upon attachment of such threads coated with hot-melt adhesive to fold tips, the thread is loaded radially in the direction toward the fold edges with compressed air, in particular hot compressed air, so that the hot glue reaches the fold tips or fold edges. A correspondingly manufactured annular filter element is also known from DE 20 2006 008 596 U1.

SUMMARY OF THE INVENTION

In view of this background, the present invention has the object to create an improved filter element, in particular a filter element that can be manufactured with little expenditure. Moreover, a simplified manufacturing method is desirable.

Accordingly, a filter element for filtering a fluid is proposed which comprises a zigzag-shaped folded filter medium with a plurality of fold edges. The zigzag-shaped folded filter medium is provided with at least one thread that is attached by means of an adhesive material to the fold edges, wherein the thread is embodied in the manner of a multiple-wound yarn.

The filter element is therefore designed in particular for filtering combustion air in a motor vehicle and/or for filtering operating media of a motor vehicle. In embodiments, the filter element is an air filter, in further embodiments it is a cabin air filter. A fold pack of zigzag-shaped folded filter medium is also referred to as folded bellows. The filter medium is also referred to as filter material.

The fold edges delimit in this context adjacently positioned fold sections, wherein neighboring fold edges in this context have the same fold orientation and form an inflow or outflow side of the filter element. The thread sections attached to the fold edges are in particular reinforced by cured or hardened adhesive material and can determine the distances between fold edges.

In embodiments, the fold edges and the threads with the adhesive material that extend transversely thereto form a grid structure that make the zigzag-shaped folded filter medium shape-stable.

The embodiment of the thread as a multiple-wound yarn leads to a better adaptation to the fold edges during the manufacture in comparison to yarns with twisted or wound-together filaments or fibers. For multiple-wound yarns, the fiber components of the thread extend substantially adjacent to each other and only cross each other to a negligible extent or are wound together sporadically. In this way, in particular during the manufacture the adhesive material in the plastic state is better absorbed by the thread, and pressing of the thread coated with adhesive onto the fold edges can be realized with reduced force during the manufacture.

In embodiments, the fold pack is bent to a cylinder-shaped endless folded bellows. In this context, in particular the end fold sections of the fold pack are connected to each other fluid-tightly. By means of a corresponding endless folded bellows, for example, a round filter geometry can be realized. Optionally, end disks or end rings that form the respective cover surfaces of the cylindrical round filter element can be attached to the fold profiles. In this respect, the endless folded bellows comprises then end rings at the end faces which are attached fluid-tightly to fold profiles of the zigzag-shaped folded filter medium. The end rings can comprise an inserted disk, for example, of metal and/or synthetic material, and can be closed. In embodiments, the end rings are glued, foamed or welded to the filter medium.

In embodiments, the filter element comprises then one or a plurality of threads that are attached by adhesive material to the fold edges and extend in particular spirally about the cylindrical round filter element. In embodiments, the round filter element is designed with an oval non-circular cross section. In particular for such non-circular cross section geometries, the multiple-wound yarns are suitable for forming a reinforcing or stabilizing structure together with the adhesive material.

In embodiments, the thread comprises several fibers and the adhesive material at least partially coats the thread and/or the adhesive material is also present between the fibers. In comparison to twisted or wound-together fibers for forming conventional yarns, in particular the interior of the thread can be coated easily with adhesive material that is plastic. In this respect, multiple-wound yarns can be attached particularly well to the fold edges.

In embodiments, between two directly neighboring fold edges of the same fold orientation, the fibers of the thread extend parallel to each other and are connected by adhesive material. Preferably, the yarn comprises filaments and is multiple-wound n-times, wherein n is greater than 20, preferably greater than 50, and even more preferred greater than 100.

In embodiments, the thread has less than 20, preferably less than 20, even more preferred less than 10, twists per meter (twist of initial twist) according to ISO-17202:2002.

Conceivable is a thread fineness of 2,500 to 4,500 dtex, preferably 3,000 to 4,000 dtex, even more preferred 3,200 to 3,800 dtex, according to DIN EN 2060.

In embodiments, the thread has a maximum cross section expansion on the fold edges between 0.2 mm and 10 mm. The maximum cross section expansion extends in the attached state of the thread in general transversely to the respective fold edge, due to the tension during wrapping and due to the multiple-wound configuration instead of fibers wound together or twisted.

In embodiments, the fibers in the initial state of the thread, prior to the attachment to the fold edges and coating with adhesive, have a diameter between 0.2 mm and 10 mm. In particular, thread thicknesses or diameters between 0.4 mm and 5 mm have been found to be beneficial because a good compromise between the resulting contact surface at the fold edges and the material expenditure results in this range of magnitude.

In embodiments, the thread and the hardened adhesive material form a support structure between the fold edges for stabilization and for spacing apart the fold edges from each other. When using multiple-wound yarns with a plurality of fibers, in particular a flat rectangular or oval cross section results so that the support structure can be shaped like a flat band. Since the individual fibers in the initial state are lying rather loosely against each other, the adhesive material beneficially penetrates into the interior of the thread.

In embodiments, several fibers of the thread are coated along their length with the adhesive material and connected adjacent to each other on the fold edges by the adhesive material in such a way that a width of the support structure along a respective fold edge is greater than a thickness normal to the fold edge. One can say that the support elements of the support structure formed of the fibers and the solid adhesive material are lying flat on the respective fold edge.

In embodiments of the filter element, the adhesive material is a hot melt adhesive material or hot glue adhesive material. In this context, the melting points of the hot glue adhesive material, for example, a thermoplastic material, are matched to the thread material such that the thread remains undamaged at the melting temperature of the hot glue adhesive material.

In embodiments, the adhesive material encompasses solvent-containing wet adhesives, contact adhesives, dispersion adhesives, hot melt adhesives, plastisols, polyaddition adhesives, polycondensation adhesives, polymerization adhesives, dry-bond adhesives.

In embodiments, the thread comprises at least one of the following elements: a yarn with filament fibers, an untwisted yarn, untwisted fibers, fibers that are not wound together, and endless filaments. The thread and/or the fibers are in particular manufactured of a polyester material.

The filter medium can be folded or of a corrugated shape. As folds, for example, zigzag folds or W folds are known. The filter medium can be embossed and subsequently folded at the embossment edges with formation of fold edges. A flat filter sheet material which is to be correspondingly deformed can serve as a starting material. The filter medium is, for example, a filter fabric, a laid filter material, or a nonwoven filter material. In particular, the filter medium can be produced in a spunbonding or meltblowing method. Furthermore, the filter medium can be felted or needled. The filter medium can comprise natural fibers, such as cotton, or synthetic fibers, for example, of polyester, polyphenyl sulfide or polytetrafluoroethylene. The fibers can be oriented during processing in, at a slant to and/or transverse to the machine direction.

The filter medium can be a single layer or multi-layered. It can comprise moreover an adsorption medium such as, for example, active carbon. Moreover, the filter medium can comprise an antimicrobial and/or anti-allergenic action. As antimicrobial substance, for example, zinc pyrithione or nanosilver is conceivable, as anti-allergenic substance, for example, polyphenol.

A corresponding filter element serves for filtering fluids, i.e., gaseous and/or liquid media, for example, air. A gaseous medium or air comprises in this context also gas or air/solid mixtures and/or gas or air/liquid mixtures. For example, an air conditioning device can comprise the filter element.

An in particular open filter medium can be designed to remove particles of the test dust A4 according to ISO 12103-1 from an air flow with a filtration rate of 0.10 to 0.30 m/s, in relation to the filter medium surface area, for an air permeability of greater than 3,000 l/m²s (determined according to ISO 9237 at 200 Pa). The determination of the filtration characteristic values can be realized, for example, according to DIN 71460-1.

A particularly high-separating filter medium can be designed to remove particles of the test dust A2 according to ISO 12103-1 as well as NaCl aerosol particles according to DIN 71460-1 from an air flow with a filtration speed of 0.10 to 0.30 m/s, in relation to the filter medium surface area, for an air permeability of greater than 600 l/m²s (determined according to ISO 9237 at 200 Pa). The determination of the filtration characteristic values can be realized, for example, according to DIN 71460-1.

The filter element or the filter arrangement can be used in passenger cars, trucks, construction machines, watercraft, rail vehicles, aircraft as well as in general in air conditioning technology, in particular in heating air conditioning devices, in household devices, in fuel cells or in the building technology. These motor vehicles or vehicles can be operated electrically and/or by means of fuel (in particular gasoline or diesel). In regard to building technology, in particular stationary devices for treatment of air are conceivable.

Moreover, a method for manufacturing a filter element is proposed.

In a manufacturing method for manufacturing a filter element, a thread of the type of a multiple-wound yarn is attached by means of an adhesive material to fold edges of a zigzag-shaped folded filter material. In this context, in particular one or a plurality of the following steps can be performed:

soaking and/or coating of the thread with adhesive material that is plastic;

attaching the thread soaked and/or coated with the adhesive by applying a pressure onto the fold edges; and hardening of the adhesive material.

By the selection of the multiple-wound yarn as a thread for forming a stabilization structure by means of the fibers and of the cured or hardened adhesive material, the manufacture, in particular of endless folded bellows, can be simplified. In embodiments, the thread which is soaked and/or coated with the adhesive material is wrapped onto the fold edges.

During wrapping, a rotation takes place, in particular of the endless folded bellows, about a horizontal axis. In this respect, a cylindrical endless folded bellows is formed from the zigzag-shaped folded filter medium. It is rotated about a horizontal axis for wrapping the thread around.

In embodiments of the manufacturing method, the thread is formed of individual fibers which are in particular endless filaments. The individual fibers are pushed apart at least partially along the fold edges upon attachment by means of a thread tension or of a pressure in the direction toward the fold edges.

Since a multiple-wound yarn is employed, the fibers which are forming the thread can perform an evasive movement laterally along the fold edges. In this way, a flat cross section structure of the formed support structure of the fibers and of the adhesive material results. Due to the thread tension, a resulting radial force can result in particular during wrapping so that the thread is pushed radially onto the fold edges. The starting cross section of the thread is enlarged in this context in an axial direction of the filter element and reduced in a radial direction.

The use of multiple-wound yarns leads to a more uniform distribution of the glued-on thread on the fold tips or fold edges. In this way, a uniform distribution of the adhesive material in or on the thread can be achieved, whereby a beneficial holding force distribution is obtained. Moreover, the multiple-wound yarn can be manufactured more simply than the otherwise commonly used yarns of endless filaments that are twisted or wound together. Multiple-wound yarn is in general more flexible or softer than otherwise commonly used conventional yarns. In this way, the processability is simplified in particular when viscous or adhesive material that is plastic is applied onto the thread.

The manufacturing process serves in particular for manufacturing a filter element described above or in the following.

In embodiments of the method, the adhesive material is applied in a flowable state onto or at the fibers. In this context, the viscosity can be adjusted, for example, by the temperature and/or composition in case of hot glue agents, such that the desired adhesive application on the thread is realized.

Further possible implementations of the invention comprise also combinations, not explicitly mentioned, of features or method steps disclosed above or in the following in relation to embodiments. In this context, a person of skill in the art will also add individual aspects as improvements or supplements to the respective basic form of the invention. The aspects, advantages, and effects which have been explained in relation to the filter element apply also to corresponding aspects of the manufacturing method, and vice versa.

Further embodiments of the invention are subject matter of the dependent claims as well as of the embodiments of the invention described in the following. In the following, the invention will be explained in more detail with the aid of embodiments with reference to the attached Figures.

BRIEF DESCRIPTION OF THE DRAWINGS

In the Figures, same or functionally the same elements, if nothing to the contrary is indicated, are provided with the same reference characters.

DESCRIPTION OF PREFERRED EMBODIMENTS

Figure 1:
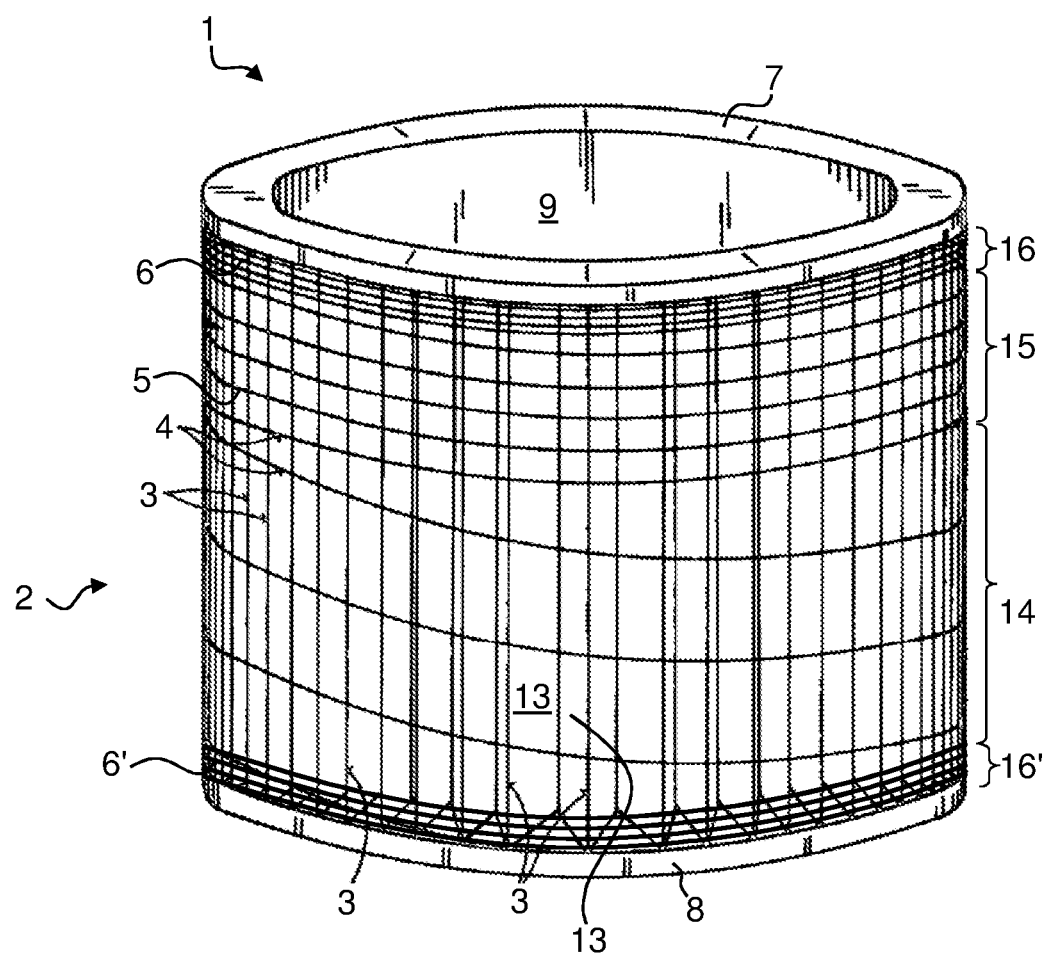
FIG. 1 shows a perspective illustration of an embodiment of a filter element.

FIG. 1 shows a perspective illustration of an embodiment of a filter element 1. The filter element 1 is embodied, for example, as an air filter element for motor vehicles, in particular for trucks or larger agricultural machines. For this purpose, a zigzag-shaped flat filter material is connected to an endless folded bellows 2 at end fold sections. In this way, a cylinder-shaped folded bellows 2 is provided which in the embodiment of FIG. 1 is provided with an upper end ring 7 and a lower end ring 8 that are each attached to fold profiles of the folded bellows 2. The end rings 7, 8 can be comprised of a synthetic material or can be foamed on by a suitable method.

In embodiments, such axially sealing end rings 7, 8 are foamed of a PUR foam material. The folded bellows 2 extends axially with neighboring outwardly oriented fold edges 3 between these end rings 7, 8 that in variants of the filter element 1 are embodied in a disk shape. Fold sections 13, of which only two are identified in FIG. 1, are arranged between fold edges 3.

In embodiments not illustrated here, a respective fluid-tight closed end ring can be formed in that a disk, for example, of metal or synthetic material, embedded in PUR foam forms a bottom. One can then also speak of an end disk. Conceivable are multi-part or single-part end disks.

The end rings 7, 8 or end disks are preferably formed such that they form axially and/or radially acting seal surfaces or seal edges.

About the circumference of the filter element 1, one or a plurality of threads 4, 5, 6, 6' are wrapped and fastened with a suitable adhesive material to the fold edges 3 at the circumference. The embodiment according to FIG. 1 shows in this context four height sections 14, 15, 16, 16' that are predetermined by the wrapping of the respective thread 4, 5, 6, 6'. The upper section 16 comprises in this context a plurality of parallel wrapped, closely neighboring threads 6 which are attached to the fold edges 3. The section 15 arranged below comprises a plurality of threads 5 wrapped parallel onto the fold edges 3 and fastened with adhesive. The lower section 14 shows a spirally wrapped thread 4 which is also attached to the fold edges 3. The last section 16' corresponds again in regard to the wrapping to the first upper section 16. In this respect, oppositely positioned sides of the filter element 1 have the same sections 16, 16' in relation to the threads 6, 6' fastened by the adhesive. In principle, the type of wrapping can vary, for example, a pitch of the thread wrapping can be changed over the course of the height, respectively, axially along the endless folded bellows 2.

The threads 4, 5, 6, 6' stabilize together with the selected adhesive material, for example, a hardened hot glue, the folds which are formed by the fold edges 3 and the fold sections 13. For example, in operation of the filter element 1, raw air is introduced into the inner region 9 and exits to the exterior radially through the endless folded bellows 2. Due to the pressure difference between the interior 9 and the external clean air region, the fold edges 3 and fold sections 13 are exposed to radial forces. A support structure for the filter element as a whole is provided due to the wrapping as a result of the attachment to the fold edges 3. In this context, a multiple-wound yarn is used as the respective threads 4, 5, 6, 6'.

Figure 2:
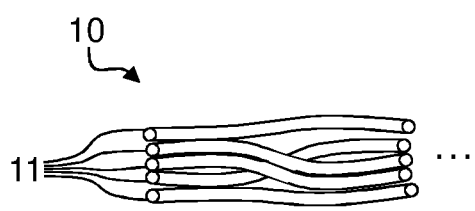
FIG. 2 shows a schematic illustration of an embodiment of a yarn for use in a filter element according to FIG. 1.

In FIG. 2, a schematic illustration of an embodiment of a suitable yarn for use as threads in the filter element 1 according to FIG. 1 is indicated. One can see in FIG. 2 that the thread 10 is embodied in the manner of a yarn with a plurality of fibers 11. In this context, the fibers 11 extend across the length of the thread 10 substantially adjacent to each other and without being twisted with each other. This means that the fibers 11, which are, for example, embodied as polyester endless filaments, can easily fray at the ends. Due to the loose arrangement next to each other in the initial state of the thread 10, the latter can now be beneficially coated or soaked with an adhesive material that is plastic in a manufacturing method for the filter element 1 according to FIG. 1. In comparison to conventional yarns that comprise usually twisted or wound-together fibers, processing is facilitated.

Figure 3:
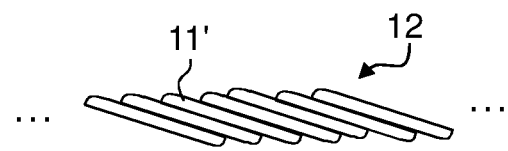
FIG. 3 shows a schematic illustration of an embodiment of a conventional yarn.
Figure 4:
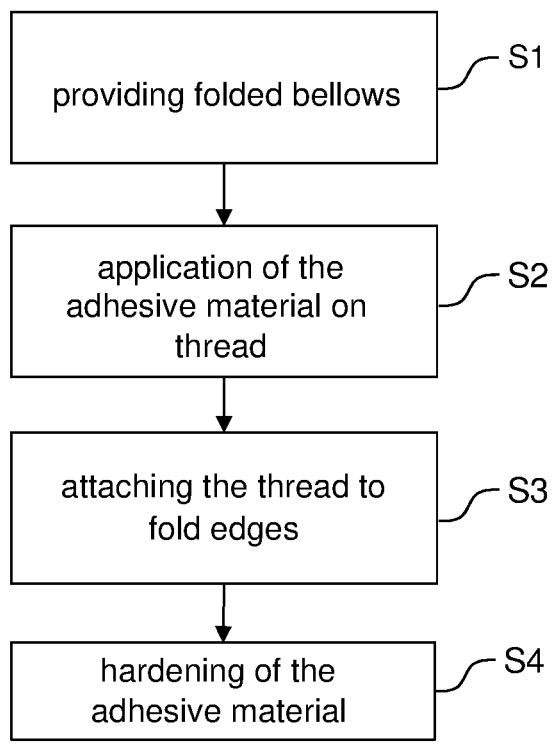
FIG. 4 shows method steps of an embodiment of a manufacturing process for a filter element.

FIG. 3 shows a schematic illustration of a conventional yarn 12. In this context, the fibers 11' are wound together or twisted along the longitudinal axis. In this respect, a more stable cross section results; however, the individual fibers 11' are also lying closer together so that soaking or coating with an adhesive material that is plastic is rather difficult.

Figure 7:
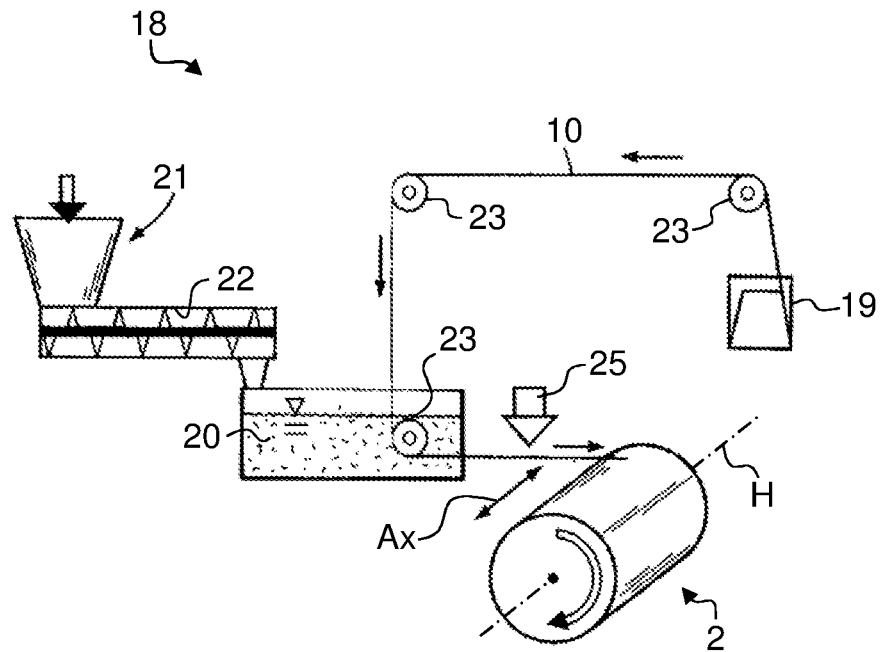
FIG. 7 shows a schematic illustration of a device for performing the manufacturing method according to FIG. 4.
Figure 8:
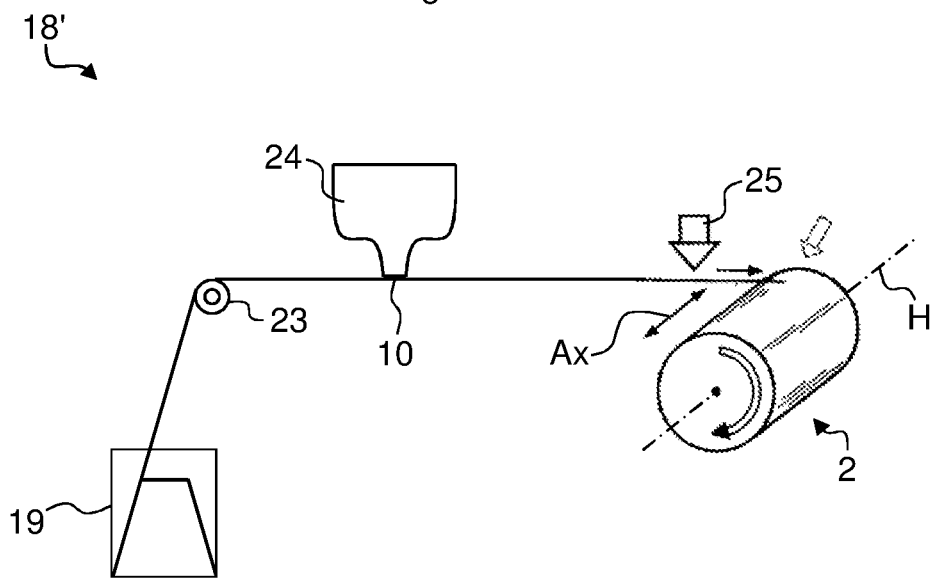
FIG. 8 shows a schematic illustration of another device for performing the manufacturing method according to FIG. 4.

In the following FIGS. 4 to 8, variants of a manufacturing method for a filter element with a thread wrapping are explained. In this context, FIGS. 7 and 8 illustrate possible manufacturing devices or arrangements for manufacturing a round filter element with a stabilizing wrapped thread.

In a first method step S1, a filter bellows 2 is provided. This can be in particular an endless folded bellows in which the end fold sections of a zigzag-shaped folded filter medium are connected to each other and in this way form a ring of folds. This is identified in FIG. 1 by reference character 2. In FIG. 7, the cylinder-shaped endless folded bellows 2 is rotated horizontally about its longitudinal axis. In this way, as is explained in the following, a thread that is soaked or coated in particular with a hot glue is wrapped about the circumference of the endless folded bellows 2.

In a second method step S2, an application of the adhesive material 17 on a thread 10 of multiple-wound yarn is carried out. In the manufacturing arrangement 18 of FIG. 7, the thread 10 is removed from a yarn spool 19 via suitable rollers 23 and supplied to a hot glue bath 20. The hot glue bath 20 is liquefied by melting of hot glue material 21, which is also referred to as hot glue adhesive, hot glue hot melt, or hot-setting glue, and is supplied by an extruder 22 to the hot glue bath 20.

Hot glues comprise usually base polymers and resin components wherein in particular polyamides, polyethylene, polyester elastomers, polyurethane elastomers, copolyamide elastomers or ethylene vinylacetate copolymers are used. As resin component, colophony or terpenes or other hydrocarbon resins are conceivable. The adhesive material 21 is supplied, for example, as a granular material and melted.

Subsequently, in step S3, the thread 10 provided with the adhesive material that is plastic is attached to the fold edges 3 of the endless folded bellows 2. A positioning device 25 can guide the thread 10, coated or soaked with adhesive, in particular axially along the fold edges 3 so that a desired wrapping geometry is generated. Subsequently, hardening of the adhesive material, for example, in a cooling step, is performed so that a support structure that is stabilizing and supporting the folds is generated from the hardened adhesive material 17 and the yarn components 10.

As an alternative to the adhesive bath 20 indicated in FIG. 7, the thread 10 can also be provided with liquid adhesive by means of a suitable adhesive application nozzle 24, as it is illustrated in FIG. 8.

The employed threads 10 of multiple-wound yarn adapt particularly well to the fold edges 3 of the zigzag-folded filter medium 2. In this way, a good adhesion and adherence to the fold edges 3 is provided. When wrapping or applying the thread 10 that is coated or soaked with the adhesive 17, a normal force is acting from the exterior in the direction toward the fold edges 3. In this way, the multiple-wound yarn deforms and forms a good adhesive connection with the material of the filter medium. This is explained in FIG. 5.

Figure 5:
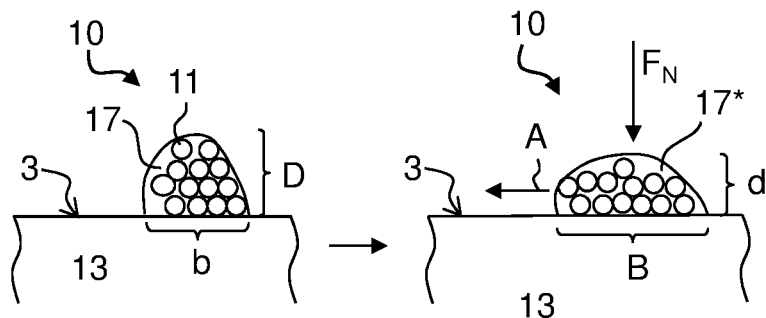
FIG. 5 shows a schematic cross section illustration of conditions of a yarn during the manufacture of a filter element.

In FIG. 5 to the left, one can see a fold edge 3 that delimits a fold section 13. The thread 10 comprises in this context a plurality of fibers 11 and, after the adhesive material application, for example, by the application nozzle 24 (compare FIG. 8) or passing through the adhesive bath 20 (see FIG. 7), is provided or coated with liquid plastic adhesive material 17. Upon attachment to the fold edges 3, for example, by wrapping, one can see that the cross section of the thread 10 initially has a width b and a thickness D. In the initial state, the thread has a width b and a thickness D which correspond approximately to the diameter of, for example, 1 mm. The liquid adhesive material is identified with 17 in this context. Since the fibers 11 are only minimally or not at all wound together, the thread 10 can be deformed in cross section by application of a normal force $F_N$ which is acting radially inwardly during wrapping around the endless folded bellows.

In FIG. 5, at the right side, the radial force $F_N$ is illustrated in this context. The force $F_N$ can be generated by the thread tension during wrapping or can be generated by an external device, for example, a roller, that is pressing on the fold edges 3. Due to the force $F_N$, an evasive movement A of the fibers 11 along the fold edge 3 results. The fibers 11 are distributed together with the adhesive material 17 along the fold edge 3 and form thus a flatter cross section. The thickness d<D is reduced in this context. At the same time, the width B>b is enlarged by wrapping of the multi-wound thread 10. The support structure which results from the solidified adhesive material 17* and the fibers 11 is therefore wider than thick, wherein the thickness is viewed radially to and the width axially along the fold edges 3. In the illustration of FIG. 5, the width B corresponds to the maximum cross section expansion of the attached thread 10.

Figure 6:
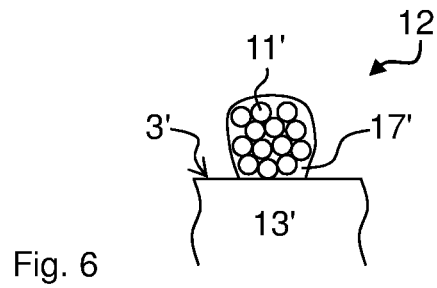
FIG. 6 shows a schematic illustration of a conventional yarn at a filter element.

In comparison thereto, in FIG. 6 a schematic cross section illustration of a conventional yarn 12 with fibers 11' and adhesive material 17' at a fold edge 3' of a fold section 13' is illustrated. In this context, the conventional yarn 12 has in particular twisted fibers 11' resting tightly against each other. These fibers 11' resting tightly against each other cannot be easily pressed against the fold edge 3' so that frequently during the manufacture of corresponding wrapped filters with twisted fibers an additional loading with air, in particular compressed air, in particular cold or hot (compressed) air, is required. Such measures can be dispensed with when using multiple-wound yarns.

Due to the multiple-wound yarns in which a plurality of individual fibers or threads are placed together and the latter are present in a loose arrangement along their length, a simple coating or soaking with liquid hot glue is possible. In this way, the adhesive in the plastic state distributes better in comparison to otherwise commonly used twisted yarns. In the wrapped and hardened state, in particular a flat support structure results on the fold tips or fold edges, in which a thickness of the support structure is less than the width on the fold edges.

Even though the present invention has been explained with the aid of embodiments, it is not limited thereto but can be modified in many ways. In particular, the multiple-wound yarn with substantially parallel extending fibers, in particular monofilament fibers, can also be used for flat filter elements. The threads that are coated or soaked with adhesive of multiple-wound yarns are then not wrapped but applied onto flat folded bellows or fold packs. Even though in the embodiment a round filter element with a circular cross section is indicated, the manufacturing method can be in particular used efficiently for oval filter elements or filter elements with a stadium cross section. The aforementioned standards relate to the state at the filing date of the application.

LIST OF REFERENCE CHARACTERS 1 filter element
2 fold pack
3, 3' fold edge
4, 5, 6, 6' thread
7, 8 end ring
9 interior
10 yarn
11, 11' fiber
12 yarn
13, 13' fold section
14, 15, 16, 16' wrapped section
17, 17' adhesive material
17* hardened adhesive material
18 manufacturing arrangement
19 yarn spool
20 adhesive bath
21 hot melt adhesive material
22 extruder
23 guide roller
24 adhesive application nozzle
25 positioning device
D, d thickness
B, b width
$F_N$ normal force
A evasive movement
H axis of rotation

What is claimed is:

1. A filter element for filtering a fluid, the filter element comprising:
    a zigzag-shaped folded filter medium comprising fold edges neighboring each other;
    a thread attached by an adhesive material to the fold edges;
    wherein the thread is a multiple-wound yarn.

2. The filter element according to claim 1, wherein the thread comprises a plurality of fibers and wherein the thread is at least partially coated with the adhesive material and/or the adhesive material is present between the fibers of the thread.

3. The filter element according to claim 1, wherein the thread and the hardened adhesive material form a support structure between the fold edges, wherein the support structure stabilizes the fold edges and spaces apart the fold edges from each other.

4. The filter element according to claim 3, wherein the thread comprises a plurality of fibers and the plurality of fibers are coated along a length thereof with the adhesive material and the plurality of fibers, on the fold edges, are connected to each other adjacent to each other by the adhesive material such that a width of the thread along a respective fold edge is greater than a thickness of the thread normal to the respective fold edge.

5. The filter element according to claim 1, wherein the zigzag-shaped folded filter medium is a cylindrical endless folded bellows and the thread is wrapped around the cylindrical endless folded bellows.

6. The filter element according to claim 5, further comprising end rings attached fluid-tightly to fold profiles of the zigzag-shaped folded filter medium at end faces of the cylindrical endless folded bellows.

7. The filter element according to claim 1, wherein the thread comprises one or more yarn elements selected from the group consisting of a yarn with filament fibers, an untwisted yarn, untwisted fibers, and fibers that are not wound together.

8. The filter element according to claim 1, wherein the one or more yarn elements comprise a polyester material.

9. The filter element according to claim 1, wherein the adhesive material is a hot glue adhesive material.

10. A method for manufacturing a filter element, the method comprising attaching a thread in the form of a multiple-wound yarn by an adhesive material to fold edges of a zigzag-shaped folded filter material.

11. The method according to claim 10, further comprising:
    soaking and/or coating the thread with the adhesive material that is in a plastic state;
    attaching the thread soaked and/or coated with the adhesive material to the fold edges by applying pressure; and
    hardening the adhesive material.

12. The method according to claim 11, further comprising wrapping the thread soaked and/or coated with the adhesive material onto the fold edges.

13. The method according to claim 11, further comprising, during attaching, pushing apart individual fibers of the thread at least partially along the fold edges and using, for applying pressure, a thread tension of the thread or a pressure applied in a direction toward the fold edges.

14. The method according to claim 10, further comprising forming the zigzag-shaped folded filter medium to a cylindrical endless folded bellows and wrapping the thread around the cylindrical endless folded bellows by rotating the cylindrical endless folded bellows about a horizontal axis.

15. The method according to claim 14, further comprising attaching end rings to end faces of the cylindrical endless folded bellows such that the end rings contact fluid-tightly fold profiles of the zigzag-shaped folded filter medium.

16. The method according to claim 15, further comprising foaming or gluing the end rings to the end faces.

* * * * *